(12) United States Patent
Morrison et al.

(10) Patent No.: US 7,149,887 B2
(45) Date of Patent: *Dec. 12, 2006

(54) SYSTEM AND METHOD FOR COMPUTER HARDWARE IDENTIFICATION

(75) Inventors: David J. Morrison, Seattle, WA (US); Darren L. McKenzie, Seattle, WA (US); Jonathan M. Keller, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/358,173

(22) Filed: Feb. 21, 2006

(65) Prior Publication Data

US 2006/0143430 A1    Jun. 29, 2006

Related U.S. Application Data

(63) Continuation of application No. 10/411,164, filed on Apr. 9, 2003, now Pat. No. 7,028,175.

(51) Int. Cl.
*G06F 15/177*    (2006.01)
(52) U.S. Cl. .............................. 713/1; 714/48; 714/57
(58) Field of Classification Search .................... 713/1, 713/100; 714/25, 45, 48, 57; 717/137, 168, 717/170
See application file for complete search history.

(56) References Cited

U.S. PATENT DOCUMENTS

| | | | |
|---|---|---|---|
| 5,740,354 A | 4/1998 | Ben-Natan et al. | 395/183.21 |
| 5,790,779 A | 8/1998 | Ben-Natan et al. | 395/183.15 |
| 6,074,434 A | 6/2000 | Cole et al. | 717/11 |
| 6,553,507 B1 | 4/2003 | Cohen | 714/4 |
| 6,591,379 B1 | 7/2003 | LeVine et al. | 714/38 |
| 6,751,794 B1 | 6/2004 | McCaleb et al. | 717/168 |
| 6,757,837 B1 | 6/2004 | Platt et al. | 714/4 |
| 6,856,696 B1 | 2/2005 | Ajioka | 382/173 |
| 7,028,175 B1 * | 4/2006 | Morrison et al. | 713/1 |
| 2001/0044782 A1 | 11/2001 | Hughes et al. | 705/59 |
| 2003/0028825 A1 | 2/2003 | Hines | 714/37 |

OTHER PUBLICATIONS

Paskett, J. et al., "Accessing the Registry", 2001, http://groups.google.com/group/microsoft.public.scripting.wsh/browse_thread/thread.

* cited by examiner

*Primary Examiner*—James K. Trujillo
*Assistant Examiner*—Paul Yanchus, III
(74) *Attorney, Agent, or Firm*—Woodcock Washburn LLP

(57) ABSTRACT

A system for identifying specific information regarding the hardware configuration of a computer system improves resolution of problems via online crash and is usable for other purposes as well. Embodiments of the employ applications directed by remote computers functioning as servers, which use the specific computer system hardware-configuration information provided by the identifying system.

9 Claims, 6 Drawing Sheets

FIG. 6

```
<DEVICE>
    <DESCRIPTION>Printer Port</DESCRIPTION>
    <HARDWAREID>ACPI\PNP0400</HARDWAREID>
    <SERVICE>Parport</SERVICE>
    <DRIVER>parport.sys</DRIVER>
</DEVICE>
```
— 611

```
<DRIVER>
    <FILENAME>10B9_MyOEM_MyModelName.mrk </FILENAME>
    <FILESIZE>4175</FILESIZE>
    <CREATIONDATE>02-05-2003 01:09:48</CREATIONDATE>
    <VERSION>0.0.0.0</VERSION>
    <MANUFACTURER />
    <PRODUCTNAME />
</DRIVER>
```
— 613

SYSTEM AND METHOD FOR COMPUTER HARDWARE IDENTIFICATION

CROSS REFERENCE TO RELATED APPLICATIONS

This application is a continuation application and claims priority to U.S. patent application Ser. No. 10/411,164, filed Apr. 9, 2003 now U.S. Pat. No. 7,028,175, entitled "Systems and Methods for Computer Hardware Identification", which is incorporated herein by reference in its entirety.

TECHNICAL FIELD

The invention relates generally to the analysis of computer operating system crashes, and, more particularly, to identifying computer system hardware by manufacturer, model name, and other criteria related to the manufacturing of the computer system, in order to facilitate operations such as the analysis and correction of errors in driver software.

BACKGROUND OF THE INVENTION

The personal computer (PC) industry has evolved in such a way that end users of personal computers typically obtain the computer as part of a preconfigured system of hardware components with operating system (OS) software and important application software preinstalled. The assembly of the hardware of such a system and the preloading of software is accomplished by original equipment manufacturers (OEMs). OEMs in turn obtain the OS and application software from software vendors and obtain driver software, typically associated with component hardware devices in the system (such as audio, keyboard, display, video, or printer devices), from driver vendors. Particular PC models or configurations manufactured by OEMs are designed with the interests of distinct categories of users in mind.

While this separation and specialization of functions in the production of PC systems benefits end users of computers by providing them with a useful working system at the outset, it also complicates the correction of errors in preinstalled software. Software errors decrease the usefulness and ease of use of PCs and the software programs reboot following the crash. The user is then given the option of submitting crash data over the Internet. Submitted data is stored, sorted and analyzed, and crash reports are made available to appropriate OEMs and driver vendors. The use of crash data from the user's machine is restricted in accordance with a privacy agreement with the user.

The expedited communication of real-world driver errors to OEMs and driver vendors has the potential of enhancing their ability to identify and correct such errors and reduce associated support costs. However, prior to the invention described herein, OCA's effectiveness had been significantly limited by the absence of an efficient means for OCA to obtain more specific hardware-configuration information about the machine on which a system crash occurred. The end user crashes reported by OCA were difficult for driver writers to reproduce and thus to diagnose and correct. It was found that crashes were typically specific to particular PC system models or chipsets, but this was not easy to determine through OCA because of the lack of a simple and efficient means of gathering information identifying a particular PC system by details of its OEM hardware configuration. Previous solutions to the general problem of identifying machines have suffered from costliness and complexity, however. Typically, such solutions have involved engineering changes, or have been dependent on the broad adoption of complex standards among the large number of PC OEMs.

SUMMARY OF THE INVENTION

The present invention is a flexibly designed, efficient mechanism for identifying specific information regarding the hardware configuration of a computer system, for purposes of online crash analysis as well as for other purposes. The invention is used in association with applications, particularly those directed by remote computers functioning as servers, which benefit from having readily available, specific hardware-configuration information about a particular computer system.

In an embodiment of the invention a client computer detects an event such as an attempt to load an application, driver, etc. or a crash, such as of a driver, an application, or the operating system itself. The client responds to the event by initially locating in its file system, such as in a driver directory, a marker file. The marker file preferably has an extension that distinguishes it from the driver files in the directory. The marker file embodies, in one or both of its name and its contents, information indicative of the hardware configuration of the first computer. The hardware information stored in the marker file may alternatively be stored in a read only memory of the client, such as with the BIOS. The client can either use the information itself, such as when selecting an appropriate version of software to install, or transmit some or all of the hardware configuration information from the file to another computer, such as for online crash analysis.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 6 provides two excerpts from an exemplary XML file generated by the OCA crash reporting client, including information obtained from the invention, which is transmitted along with a minidump file to the OCA crash reporting server.

DETAILED DESCRIPTION OF THE INVENTION

Figure 1:
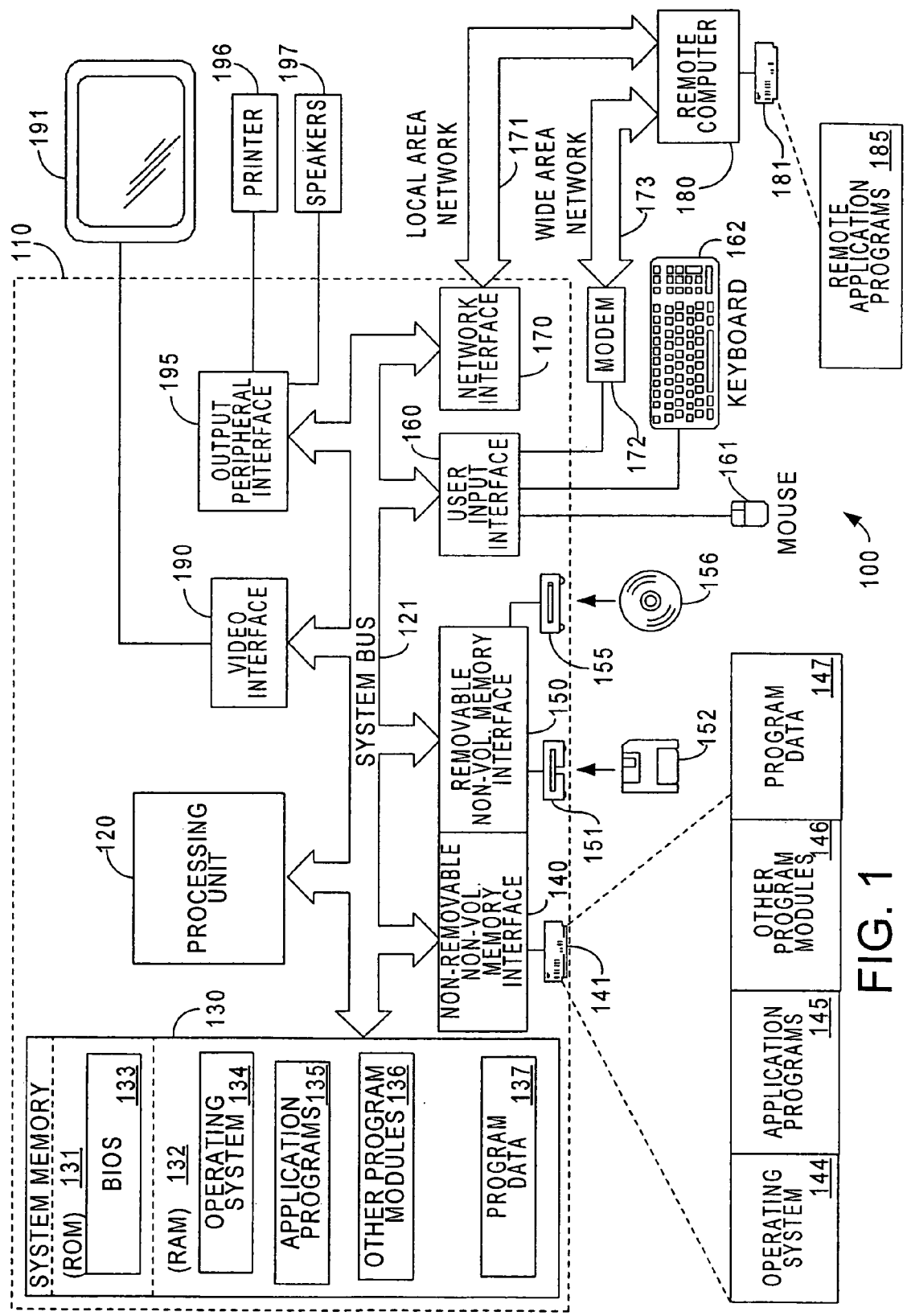
FIG. 1 is a block diagram of an exemplary personal computer system that can be used to implement embodiments of the invention.

Turning to the drawings, wherein like reference numerals refer to like elements, the invention is described hereinafter in the context of a conventional personal computing system environment such as that depicted in FIG. 1 and identified in FIGS. 2 and 3 as a crash reporting client (213 and 313). Although the invention is described hereinafter in the context of the detection and analysis of system crashes, it has alternative applications, including the detection and handling of similarly important system events. Such applications include, for example, the online analysis of application software crashes and the online distribution and installation of new or updated software on a user's system in a manner tailored to the hardware configuration details of the user's machine.

FIG. 1 illustrates an example of a suitable computing system environment 100 on which the invention may be implemented, including a general-purpose computing device in the form of a computer 110. The computing system environment 100 is only one example of a suitable computing environment and is not intended to suggest any limitation as to the scope of use or functionality of the invention. Moreover, the computing environment 100 should not be interpreted as having any dependency or requirement relating to any one or combination of components illustrated in the exemplary environment 100. The invention is operational with numerous other general-purpose or special-purpose computing system environments or configurations.

The invention is described in the general context of computer-executable instructions executed by a computer. Components of the computer 110 may include, but are not limited to, a processing unit 120, a system memory 130, and a system bus 121 that couples various system components to the processing unit 120. The computer 110 typically includes a variety of computer-readable media, including volatile/nonvolatile and removable/non-removable computer data storage media. One such medium is the system memory 130, typically including both ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. Generally, program modules include routines, programs, objects, components, data structures, etc., that perform particular tasks or implement particular abstract data types. By way of example, and not limitation, FIG. 1 illustrates an operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from and writes to non-removable, nonvolatile magnetic media such as a hard disk 141, a magnetic disk drive 151 that reads from and writes to a removable, nonvolatile magnetic disk 152, and an optical disk drive 155 that reads from and writes to a removable, nonvolatile optical disk 156 such as a CD-ROM. The drives and their associated computer storage media discussed above and illustrated in FIG. 1 provide storage of computer-readable instructions, data structures, program modules, and other data for the computer 110. In FIG. 1, for example, the hard disk 141 is illustrated as storing an operating system 144, application programs 145, other program modules 146, and program data 147. Among its many other functions, the operating system 134 loaded in memory 130 enables computer programs and machine instructions to control hardware devices in the computer system 100, including nonvolatile storage media such as the hard disk 141. Data stored on the hard disk 141 is typically accessed by the operating system 144 through the files in the filesystem, a high-level representation of the stored data. The computer 110 may operate in a networked environment using logical connections to one or more remote computers, such as a remote computer 180.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains the data at locations in the memory system of the computer, which reconfigures or otherwise alters the operation of the computer in a manner well understood by those skilled in the art. The data structures that maintain data are physical locations of the memory that have particular properties defined by the format of the data. However, while the invention is being described in the foregoing context, it is not meant to be limiting, as those of skill in the art will appreciate that the acts and operations described hereinafter may also be implemented in hardware.

Figure 2:
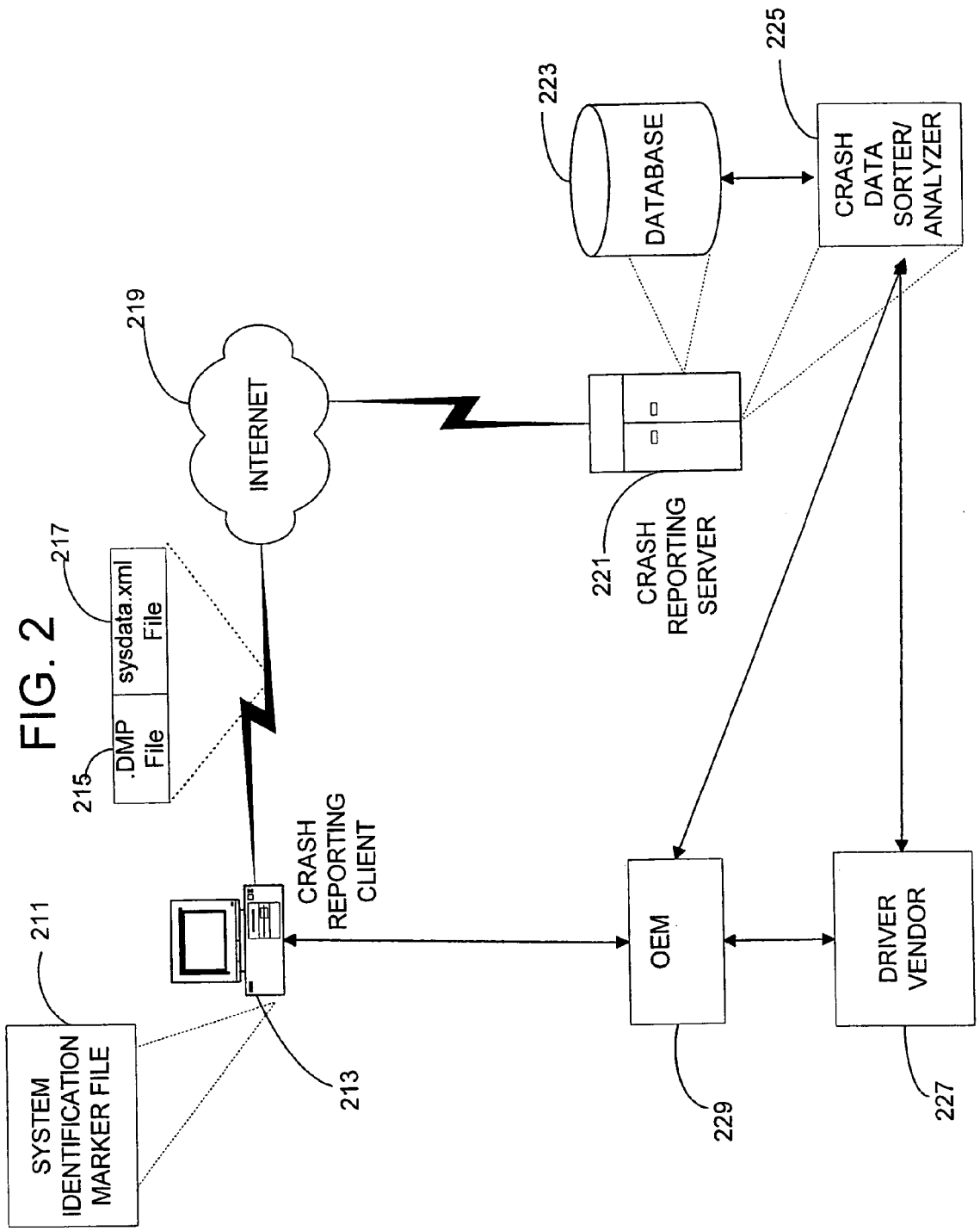
FIG. 2 is an architectural diagram of the OCA system showing interaction among crash-experiencing personal computer users, the web-based OCA analysis and database facility, and OEMs and driver vendors.
Figure 3:
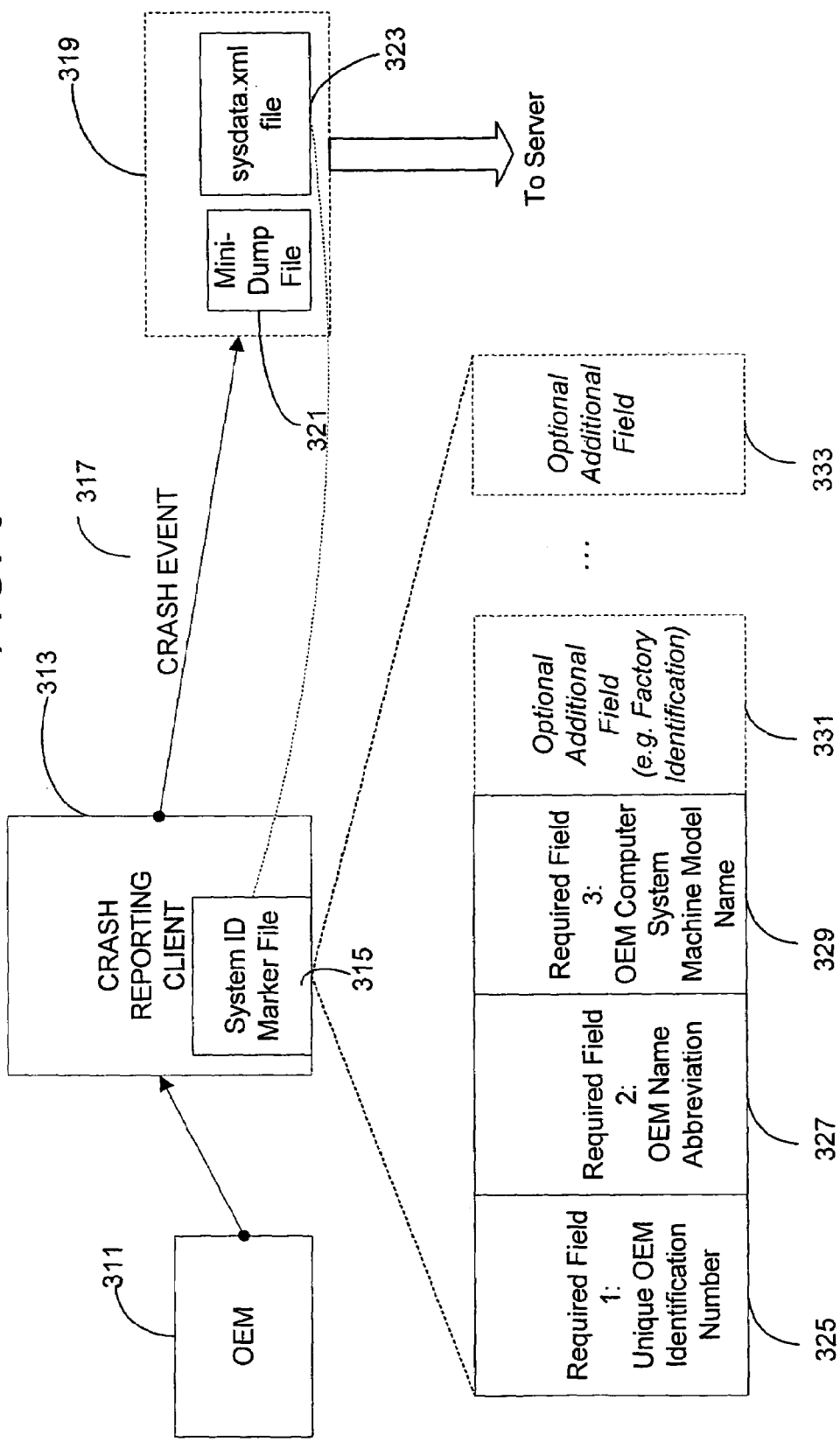
FIG. 3 is a diagram illustrating the format of a system-identifying marker file and locating the marker file within a process extending from preinstallation by the OEM to the sending of crash data following a OS kernel-mode crash.

Referring now to FIGS. 1, 2 and 3, in an exemplary embodiment, a system identification marker in accordance with the invention takes the form of a special text file, hereinafter called a "marker file" (211 and 315), on the filesystem accessed by computer's operating system 134. The marker file (211 and 315) includes attributes of the computer system 100 that specifically identify distinctive aspects of that system. Alternatively, these attributes can be maintained using other mechanisms. For example, an extended form of BIOS 133, containing system-marking information identifying specific computer system models or hardware configurations, can be installed by the OEM (229 and 311) in the computer's ROM 131, where it is nonvolatilely stored. The system-marking extended BIOS settings can then be detected by programs through the BIOS interface.

In accordance with the invention, the marker file (211 and 315) residing on the computer's filesystem stores information identifying a computer system 100 according to important aspects of its original hardware configuration. In one embodiment of the invention, the marker file (211 and 315) identifies the OEM (229 and 311) that manufactured the computer system 100 and the OEM's model name for that system, among other system-identifying information. This information enables processes or facilities to benefit from having ready access to highly specific, finely-grained information about particular computer hardware systems, including but not limited to systems of online analysis, diagnosis and reporting of kernel-mode crash data such as Windows XP's OCA, which is illustrated in the flowchart contained in FIG. 4.

Figure 4:
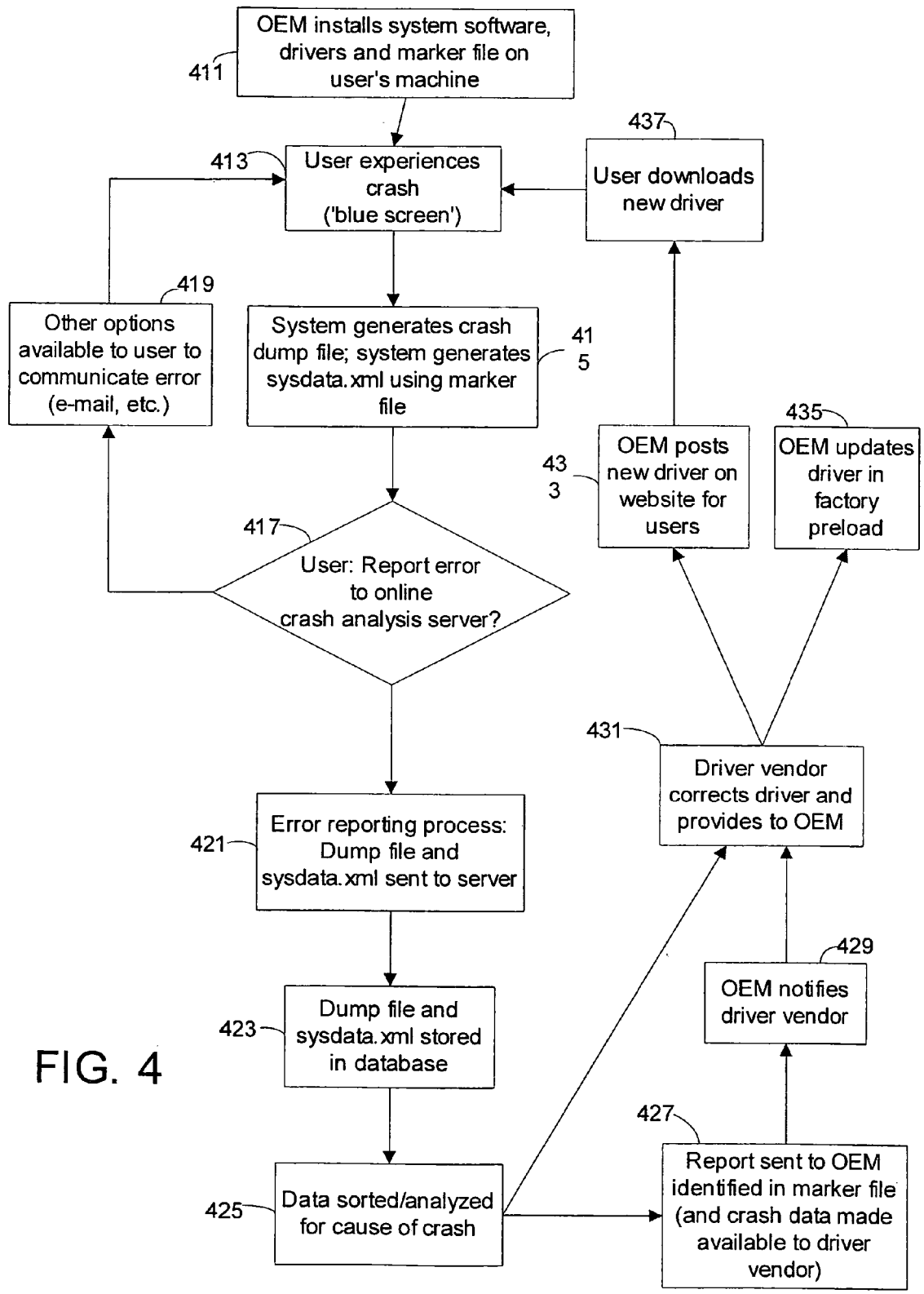
FIG. 4 is a flowchart of the entire OCA process, including the use of the invention in crash analysis.

Referring to FIGS. 2, 3 and 4, it is the responsibility of the OEM (229 and 311) to place the marker file (211 and 315) in a manufactured PC system's Windows XP drivers directory, ordinarily in the course of its preinstallation of Windows XP system software and application software on the computer's hard disk 141 for the customer, as indicated in Step 411. The marker file (211 and 315) is, by design, simple and flexible in its specified format, so OEMs (229 and 311) can add fields or data to suit their particular present or anticipated system identification needs. The current specification of the marker file format allows OEM data used in online crash analysis to be contained entirely within fields of the marker file name itself. FIG. 3 includes a schematic diagram of the format of the marker file (211 and 315). The required data can alternatively be contained within the contents of the file. Placing all system-identifying information in the filename itself is particularly advantageous for OCA because the file need not be opened and all marker data to be parsed by OCA is accessible simply by reading a file directory.

Referring to FIG. 3, in one implementation, the marker file 315 includes the features listed in Table 1 below:

TABLE 1

MARKER FILE FEATURES

The filename terminates in the extension .MRK.
The filename is less than 256 characters in length, including the file system path.
The filename conforms to Windows XP long filename requirements.
In particular, the characters comprising the filename are
letters, numbers, periods, hyphens, commas or parentheses.
Required fields (325, 327, and 329) and optional fields (331 and 333) in the filename are separated by the underscore character "_".
The marker file 315 is placed in the filesystem directory
C:\WINDOWS\SYSTEM32\DRIVERS.
The contents of the marker file 315 are unspecified and are not read by
OCA. However, OEMs 311 may use them for additional information
related to the PC system configuration, such as Windows Management
Instrumentation (WMI) tables. OCA may parse the marker file
contents and use them in crash data analysis reporting to OEMs and
Driver vendors.
The fields within the .MRK filename are as follows:
Field 1 (323) contains the OEM PnP Vendor ID, a four-digit value
uniquely identifying the OEM 311.
Field 2 (325) contains the OEM name in a form of the OEM's choosing.
Field 3 (327) contains a name identifying the PC system model.
Any number of additional fields (329, 331) may be appended to
the filename by the OEM 311 (subject to the filename length
limitations), using underscores as field separators. For example, OEMs
may add a field 329 indicating the factory in which the PC system was
assembled. Such additional fields can be parsed and used in the OEM-
specific reports generated by OCA.
OEMs 311 may install multiple marker files.

Figure 5:
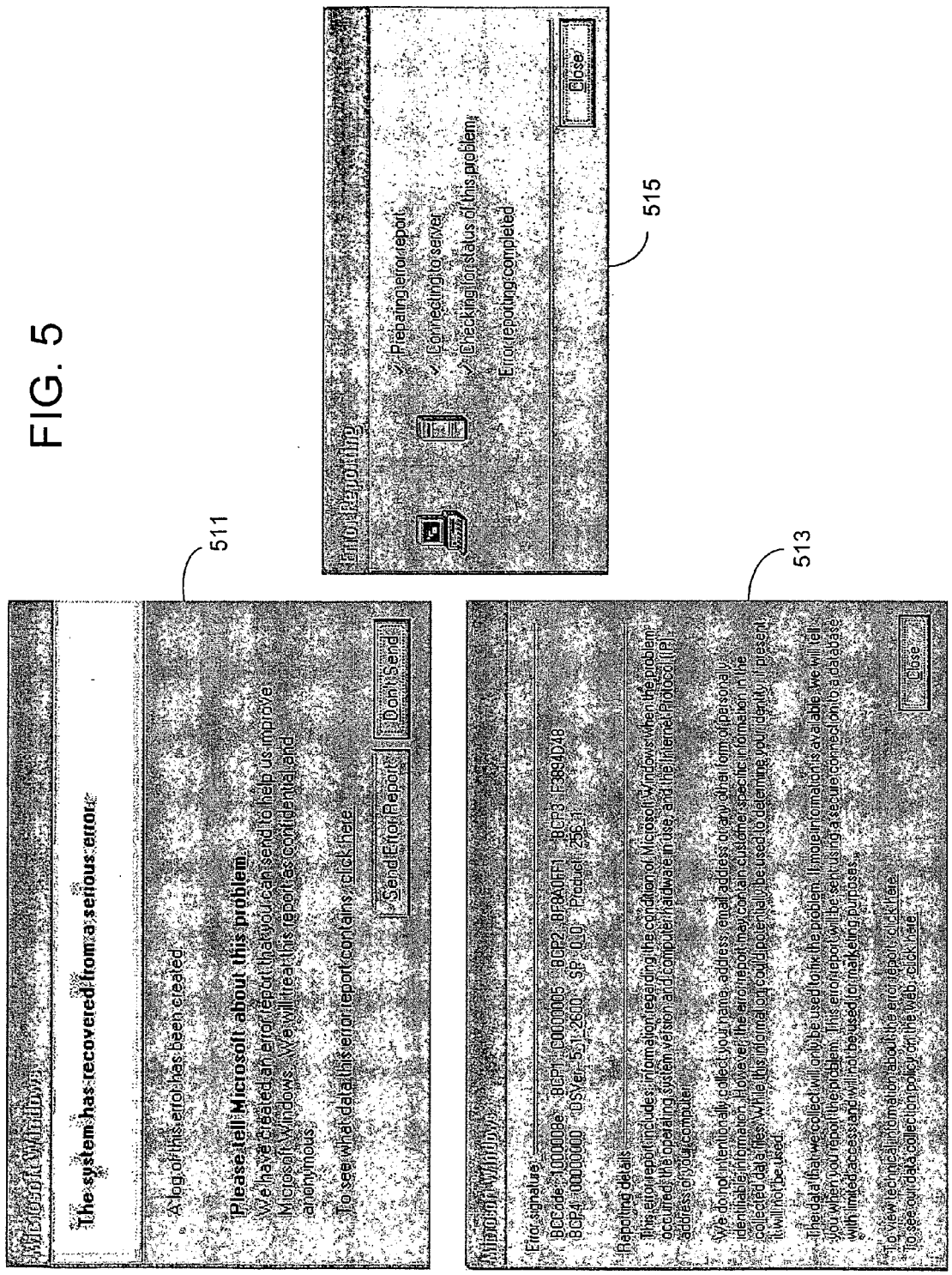
FIG. 5 provides examples of the graphical user interface windows displayed to the user by the OCA process following a crash and reboot.

The flowchart of FIG. 4, which should be read in conjunction with FIGS. 2, 3 and 5, illustrates the invention as an enhancement of OCA. In Step 413, a Windows XP user experiences an OS kernel-mode crash (also known as a blue-screen crash) 317. The OCA program saves data relating to the crash, which it uses in generating crash-related data files in Step 415, described further in the following paragraph. The user must then reboot the PC. Following the reboot, the OCA crash reporting client program (213 and 313) on the user's system displays a graphical user interface window 511 providing the option of submitting crash data to the OCA crash reporting server 221 via the Internet 219. The user is able to view a summary 513 of the contents of the files that would be submitted prior to making the decision in Step 417.

Following a kernel-mode crash in Step 413, in Step 415 two crash data files are created by the OCA crash reporting client (213 and 313) and, if the user so opts, transmitted to the remote OCA crash reporting server 221: a 64K minidump (.DMP extension) file (215 and 319) and an XML file named sysdata.xml (217 and 321). Prior to the present invention, the crash-related information contained in the minidump and sysdata.xml files consisted principally of the information in Table 2 below:

TABLE 2

SYSTEM ATTRIBUTES COLLECTED BY OCA WITHOUT MARKER FILE

Driver information, including drivers loaded in memory at the time of the crash, and a list of all drivers in the C:\WINDOWS\SYSTEM32\DRIVERS directory on the Windows XP filesystem, whether or not such drivers are loaded at the time of the crash.
A portion of the instructions on the memory stack at the time of the crash.
System uptime (the time from boot to crash).
OS information, such as version and build number.
Processor information, including manufacturer, processor name, version, speed, and the number of processors.
PnP (plug-and-play) identification for the computer system's devices (only in Windows XP Service Pack 1 and subsequent operating systems).

Referring to FIGS. 1–4, the addition of the functionality of identifying devices by PnP number permitted OCA for the first time to identify the OEM (229 and 311) in many cases with some certainty. However, even where this identification was possible, more specific information about the OEM (229 and 311), the computer system model, and other aspects of the original manufacture and hardware configuration of the computer, such as the factory that produced the system, remained unavailable. This limited the practical usefulness of the obtainable crash data in identifying driver bugs. By providing additional OEM-specific information in the marker file (211 and 315) in keeping with the invention, the ability to analyze kernel-mode crashes and correct drivers responsible for those crashes is considerably enhanced.

Returning to the flow chart of FIG. 4, if, as in Step 411, the OEM (229 and 311) has placed a marker file (211 and 315) on the system in keeping with the invention, the sysdata.xml file (217 and 321) generated in Step 415 includes data from the marker file. More specifically, in one embodiment of the invention the marker file (211 and 315) includes information in the marker file's name that specifies the OEM (229 and 311) of the computer system 100 exemplified in FIG. 1. FIG. 6 provides two excerpts from an exemplary sysdata.xml file: information on a driver contained on the hard disk (here the parallel printer port driver parport.sys) 611, and information on a marker file (here identifying a hypothetical system with OEM MyOEM and model name MyModelName) 613. Alternatively, the file contents, as well as other data structures or methods, may contain OEM-related information.

In Step 421 the minidump (215 and 321) and sysdata.xml (217 and 323) files are uploaded by the user system's OCA crash reporting client (213 and 313) to the crash reporting server 221 at the destination OCA site. In Steps 423 and 425, the crash reporting server 221 parses, sorts and analyzes the data in the minidump (215 and 321) and sysdata.xml (217 and 323) files, with the latter now enriched by system-identifying information derived from the marker file (211 and 315). As part of Step 425, the crash reporting server 221 assigns the crash to a bucket. Buckets are roughly equivalent to bugs; a bucket represents a particular error diagnosis for a set of related crashes (attributable to the same driver or other program). Buckets aid the fixing of driver errors by OEMs (229 and 311) and driver vendors 227, a process that occurs in Steps 427, 429, 431 and 435. Each bucket is identified by a descriptive identification code (BucketID) and a number (iBucket). The crash reporting server records and updates bucket counts as part of Steps 425 and 427. The analysis is stored in a database 223.

OEMs (229 and 311) have access to a secured portal website reporting the OCA data as exemplified in Table 3 below:

TABLE 3

OCA DATA AVAILABLE TO OEMS THAT INSTALL MARKER FILES

Buckets sorted according to driver-related information (driver name, driver file date, driver vendor, and device category)
Buckets sorted according to OEM name
Buckets sorted according to OEM model
Updated resolution status on driver fixes
Driver distribution information (e.g., whether the driver is available to Windows XP users by way of the online Windows Update facility)

OEMs (229 and 311) are given access to data about their own machines only. As indicated in Step 427, OEMs (229 and 311) are also sent monthly reports containing counts for each bucket. Bucket counts, combined with marker file data, enable OEMs (229 and 311) to prioritize driver-related problems. OEMs (229 and 311) may also be given OCA data in other forms and ways aside from those mentioned here.

Prior to the incorporation of the invention into OCA, buckets were sortable according to driver-related information, but could not be organized, sorted or analyzed using helpful OEM-specific system information as criteria to achieve more finely-grained tabulations of crashes. OEMs (229 and 311) that have installed marker files (211 and 315) on their PC systems, as in Step 411, are now able to obtain crash profile reports, as in Step 427, organized according to the specific system models assembled and marketed by the OEM (229 and 311). This OEM-specific information provides the OEM (229 and 311) with data regarding the BIOS 133 originally loaded on the PC 110 (which is rarely updated by end users), the PC's motherboard (not identified in FIG. 1, though corresponding essentially to 110), and the PC's memory configuration 130, among other forms of system-identifying information. Because the marker file format is significantly customizable according to the needs of individual OEMs (229 and 311), crash data can be as specific as OEMs desire, extending, for example, to information regarding the manufacturing division and line of business associated with a manufactured PC system 100.

The incorporation of the invention into OCA, enabling OCA to generate more specific crash data reports to OEMs (229 and 311), permits OEMs to participate more actively in the driver debugging process and enables end users to obtain driver fixes more quickly, because of reductions in development costs and improved communications to users. In Steps 427 and 431, OEMs (229 and 311) and driver vendors 227 can now refer to the marker filename in crash reports to quickly determine whether a problem is specific to an individual model or small group of similarly-configured models, saving significant time in driver debugging. Marker file data associated with a bucket facilitates reproduction of problems and validation of fixes by focusing debugging and testing on the specific hardware on which the problems are occurring. By installing marker files (211 and 315), as in Step 411, OEMs (229 and 311) can monitor the quality of individual drivers and the stability of particular PC models, encourage driver vendors 227 to fix higher-priority problems (Step 429), make decisions relating to driver changes in their preinstallation of software (Step 435), and target distribution of driver fixes so that new drivers can be installed only on those systems that, because of their particular hardware configurations, require the fix.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A method of responding to an event at a first computer, the method comprising:
    detecting an event at the first computer;
    in response to detecting an event, locating at the first computer a marker file including a marker file name residing on the first computer, the marker file embodying information indicative of a hardware configuration of the first computer; and
    at the first computer, responding to the event by using at least a portion of the information indicative of the hardware configuration of the first computer;
    wherein the name of the marker file embodying information indicative of a hardware configuration of the first computer contains information identifying an original equipment manufacturer of the first computer, a model name of the first computer, and an identification string associated with the first computer.

2. A method of responding to an event at a first computer in a computer environment comprising the first computer and a second computer, wherein the first and second computers are interconnected via a network connection, the method comprising:
    detecting an event at the first computer;
    in response to detecting an event, locating at the first computer marker information in a read only memory of the first computer, the marker information embodying information indicative of a hardware configuration of the first computer; and
    transmitting at least a portion of the marker information to the second computer over the network connection;
    wherein locating the marker file comprises locating the marker file within a folder on the first computer containing driver files, wherein the marker file has an extension that distinguishes the marker file from the driver files.

3. A computer-readable medium having computer-executable instructions for performing a method of responding to an event at a first computer in a computer environment comprising the first computer and a second computer, wherein the first and second computers are interconnected via a network connection, the method comprising:
    detecting an event at the first computer;
    in response to detecting an event, locating at the first computer a marker file including a marker file name residing on the first computer, the marker file embodying information indicative of a hardware configuration of the first computer; and
    transmitting at least a portion of the information indicative of a hardware configuration of the first computer to the second computer over the network connection;

wherein the name of the marker file embodying information indicative of a hardware configuration of the first computer contains information identifying an original equipment manufacturer of the first computer, a model name of the first computer, and an identification string associated with the first computer.

4. The computer-readable method according to claim 3, wherein the step of detecting an event comprises detecting a crash of a software component running on the first computer.

5. The computer-readable method according to claim 4, wherein the software component running on the first computer comprises at least one of an operating system, an application, and a driver.

6. The computer-readable method according to claim 3, wherein the step of detecting an event comprises detecting a request for information by the second computer prior to download from the second computer to the first computer over the network connection of a software component.

7. The computer-readable method according to claim 6, wherein the software component is one of an application and a second version of a driver corresponding to an update of a first version of the driver, wherein the first version already resides on the first computer.

8. The computer-readable method according to claim 3, wherein the step of locating at the first computer a marker file comprises locating at a first computer a marker file indicative of a hardware configuration of the first computer containing information identifying an original equipment manufacturer of the first computer, a model name of the first computer, and an identification string associated with the first computer comprising an identification number.

9. The computer-readable method according to claim 3, wherein the step of locating at the first computer a marker file comprises locating at a first computer a marker file comprises locating the marker file within a folder on the first computer containing driver files, wherein the marker file has an extension that distinguishes the marker file from the driver files.

* * * * *